United States Patent [19]

Pisano

[11] Patent Number: 4,672,806

[45] Date of Patent: Jun. 16, 1987

[54] ISOCHRONOUS GAS TURBINE SPEED CONTROL

[75] Inventor: Alan D. Pisano, Chelsea, Mass.

[73] Assignee: General Electric Company, Cincinnati, Ohio

[21] Appl. No.: 722,035

[22] Filed: Apr. 11, 1985

Related U.S. Application Data

[62] Division of Ser. No. 461,774, Jan. 28, 1983, Pat. No. 4,532,763.

[51] Int. Cl.⁴ ............................................. F02C 9/28
[52] U.S. Cl. ................................................ 60/39.03
[58] Field of Search ............... 60/39.02, 39.03, 39.281

[56] References Cited

U.S. PATENT DOCUMENTS

| | | | |
|---|---|---|---|
| 3,928,962 | 12/1975 | Maker | 60/39.28 R |
| 3,956,884 | 5/1976 | Eves | 60/39.281 |
| 3,971,208 | 7/1976 | Schwent | 60/39.03 |
| 4,018,044 | 4/1977 | Joby et al. | 60/39.281 |
| 4,018,045 | 4/1977 | Greune et al. | 60/39.28 R |
| 4,040,250 | 8/1977 | Saunders et al. | 60/39.281 |
| 4,423,592 | 1/1984 | Evans | 60/39.161 |
| 4,432,201 | 2/1984 | Hawes | 60/39.281 |

Primary Examiner—Louis J. Casaregola
Attorney, Agent, or Firm—Gregory A. Welte; Derek P. Lawrence

[57] ABSTRACT

An invention is disclosed in which a signal indicating a rate of fuel flow desired for a gas turbine engine is bounded between limits imposed by maximal- and minimal-fuel rates allowed under the current operating conditions of the engine and between limits imposed by maximal- and minimal-accelerations allowed under the same operating conditions. The fuel rate limits are constantly modified by feedback information about the actual acceleration experienced by the engine. This feedback information about acceleration is obtained without directly measuring acceleration itself.

1 Claim, 1 Drawing Figure

ISOCHRONOUS GAS TURBINE SPEED CONTROL

This is a division of application Ser. No. 461,774, filed Jan. 28, 1983 U.S. Pat. No. 4,532,763).

The invention relates to automatic fuel controls for gas turbine engines and, more particularly, to those which control the amount of fuel supplied to the engine in response to the rate of change of engine speed.

BACKGROUND OF THE INVENTION

In a gas turbine engine, fuel is burned in a combustor to provide heat which expands propulsion gases to provide thrust. The engine can be accelerated by adding more fuel. However, the amount of fuel added must be precisely controlled in order to prevent a condition known as engine stall. Engine stall can occur, for example, at time when the engine is at a relatively low speed. At this time the metallic elements which surround the combustor are relatively cool. Addition of more fuel can result in greater combustion, yet the heat generated by the combustion can be absorbed by these metallic elements instead of by the propulsion gases and, consequently, the increase in gas expansion will be relatively low and the engine may stall.

On the other hand, if the engine has been running at a relatively high speed for a time, and then temporarily dropped to a relatively low speed, if acceleration is attempted at this time by injection of added fuel, stall can occur but for different reasons: the previous high speed condition raised the combustor to a high temperature. The low speed condition ordinarily creates a low combustor temperature, but in this particular instance, the combustor metal has not yet cooled from the high temperature and it thus functions as a heat reservoir. When fuel is injected in the attempt to accelerate the engine, the burning fuel as well as the metallic combustor elements can inject heat into the propulsion gases. This excess heat can cause the engine to stall.

Further, under all conditions, there is a limit to the amount of fuel which can be injected into the combustor. If there were no limit imposed, when the pilot of an airplane requested instantaneous acceleration, the fuel control would otherwise inject an excessive amount of fuel into the combustor, probably stalling the engine.

A classical method of controlling acceleration to prevent stalls entails controlling the rate of fuel delivery as a function of engine speed. Stalls are reduced by programming error margins into the rate of delivery. That is, for example, the rate of fuel delivery to a cold combustor is limited by that which a hot combustor can tolerate under the same conditions. Thus, these margins prevent situations from occurring in which too little fuel is provided to a cold combustor and too much fuel is provided to a hot combustor. However, it is clear that the use of such margins prevents the attainment of the acceleration which is theoretically possible: the fuel supplied under a given set of operating conditions is limited by the error margins which are, in general, not responsive to the conditions prevalent at a given time.

Further, no two engines are identical and they will thus accelerate differently in response to the same amount of fuel supplied to each. It is desirable to sense and control the acceleration of the engines because excessive acceleration can cause thermal cycling which reduces the lifetimes of the engines. Sensing acceleration poses a problem because the speed signal generally contains a high frequency noise component which is amplified when the time derivative is taken to calculate acceleration. Thus, direct computation of the acceleration sought to be controlled presents difficulties.

Still further, many engine fuel controls commonly utilize a static compressor discharge pressure ($P_3$) as an input parameter. This poses at least two problems: one, the signal produced by the pressure transducer used is generally an analogue signal and must be digitized; and two, pressure transducers which are accurate over the necessary range of pressures (about 10 to 350 psi) are expensive.

OBJECTS OF THE PRESENT INVENTION

It is an object of the present invention to provide a new and improved turbine engine fuel control.

It is an object of the present invention to provide a new and improved turbine engine fuel control which allows more nearly uniform turbine acceleration under a wide range of operating conditions.

It is a further object of the present invention to provide a new and improved turbine engine fuel control which regulates fuel supplied in response to parameters which include engine acceleration.

It is a further object of the present invention to provide a new and improved engine fuel control which does not rely on static compressor discharge pressure as an input.

It is a further object of the present invention to provide a new and improved engine fuel control which limits the fuel supplied at a given time to the engine.

DETAILED DESCRIPTION OF THE DRAWING

Figure 1:
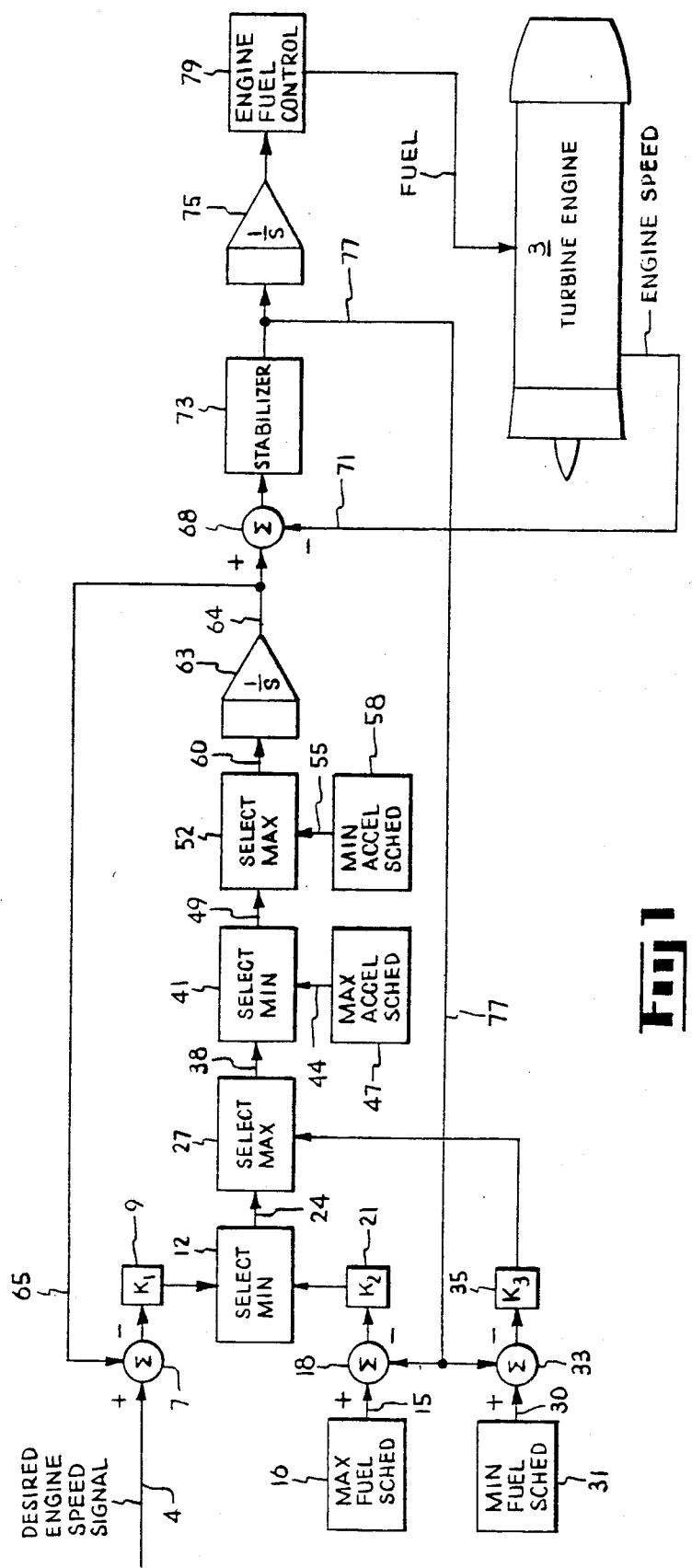

FIG. 1 is a schematic illustration of one form of the present invention shown in association with a gas turbine engine.

SUMMARY OF THE INVENTION

The invention relates to turbine engine controls which operate in response to a signal indicating a desired fuel delivery rate and which regulate the amount of fuel supplied to the engine as a function of engine acceleration and as a function of other operating conditions.

DETAILED DESCRIPTION OF THE INVENTION

In the form of the invention shown in FIG. 1, an input signal indicative of a desired speed of a turbine engine 3 is present on lead 4 and fed to the positive input (+) of a summer 7. The input signal on lead 4 can be provided by the pilot of an airplane. The output of summer 7 is fed to a multiplier block 9, the output of which is fed to an input of a minimum selector 12. A signal present on a conduit 15 and taken from a maximum metering valve velocity schedule 16 is fed to the positive input (+) of a summer 18, the output of which is fed to a multiplier block 21, the output of which is fed to the other input of minimum selector 12. Summer 18, as do all the summers herein, functions to subtract the signal at its negative input from that present at its positive input. Selector 12 functions to select the smallest of its two input signals and to feed that signal to its output 24 as a first selection signal. The effect of selector 12 is to limit the maximum attainable by output 24 to the value of the signal on conduit 15, as modified by summer 18 and multiplier 21.

The output 24 of minimum selector 12 is fed to an input of a maximum selector 27. A signal present on a conduit 30 and which is taken from a minimum metering valve velocity schedule 31 is fed to the positive input (+) of a summer 33. The output of summer 33 is fed to a multiplier block 35, the output of which is fed to the other input of maximum selector 27. Maximum selector 27 selects the largest of its two input signals and transmits it to its output 38 as a second selection signal. The effect of selector 27 is to limit the minimum attainable by output 38 to the value of the signal on lead 30, as modified by summer 33 and multiplier 35.

Output 38 is connected to an input of a minimum selector 41. The other input of minimum selector 41 is connected to a conduit 44 which carries a signal taken from a maximum acceleration schedule 47. Minimum selector 41 selects the smallest signal of its two input signals and transmits it to the output 49 as a third selection signal. One effect of selector 41 is to limit the maximum attainable by its output 49 to a limit imposed by schedule 47.

Output 49 is connected to one of the inputs of a maximum selector 52. The other input of maximum selector 52 is connected to a conduit 55 which carries a signal obtained from a minimum acceleration schedule 58 (which can also be called a deceleration schedule). Maximum selector 52 selects the greater of the two input signals and transmits it to its output 60 as a fourth selection signal. One effect of selector 52 is to limit the minimum attainable by its output 60 to a limit imposed by schedule 58.

Output 60 is connected to the input of an integrator 63. The output 64 of integrator 63 (that is, a preliminary output signal) is fed back by means of a conduit 65 to the negative input (−) of summer 7. The output 64 of integrator 63 is further connected to the positive input (+) of a summer 68, the negative input (−) of which is connected to a conduit 71. Conduit 71 carries a signal indicative of the actual rotational speed of a component such as a rotating fan blade or a compressor blade in the turbine engine 3 and this speed is the controlled variable in this system.

The output of summer 68 is connected to an input of a dynamic compensation means such as a stabilizer block 73, the output of which is connected to the input of an integrator 75 as well as fed back by means of a conduit 77 to the negative inputs (−) of summers 18 and 33. The stabilizer block 73 preferably has the following transfer function:

$$\frac{1 + St_1}{1 + St_2}$$

wherein S is the complex frequency variable and $t_1$ and $t_2$ are time constants computed by classical frequency domain techniques such as Bode analysis or Nyquist criteria. The stabilizer block 73 reduces the effects of signal transients. The output of integrator 75 is connected to fuel control equipment 79 which controls the amount of fuel delivered to the combustor (not shown) of the gas turbine engine. Preferably, the amount of fuel delivered in pounds per second is proportional to the output signal of integrator 75. And, it is to be noted, the signal at input to integrator 75 is proportional to the time derivative of the rate of fuel delivery. Thus, since the rotational speed of the engine 3 is largely dependent on the rate of fuel delivery and since the time derivative of this speed is to a great extent dependent on the time derivative of this rate of fuel delivery, the signal at the input to integrator 75 is indicative of the time derivative of engine rotational speed, that is, engine acceleration. Therefore, engine acceleration is controlled by precisely controlling the time derivative of the rate of fuel delivery which does not require a direct measurement of engine acceleration.

The operation of the equipment represented in FIG. 1 is explained as follows. The maximum and minimum fuel metering valve velocity schedules 16 and 31, as well as the maximum and minimum acceleration schedules 47 and 58, each take into consideration various engine operating parameters, such as selected temperatures, pressures and engine component velocities according to predetermined programming. The values of the parameters are sensed by transducers (not shown). The particular programming depends upon many factors, including the characteristics of the engine and engineering considerations as to the allowable fuel flow for various operating conditions. The construction of schedules 16, 31, 47, and 58 is well known in the art, as is the manner of programming them. As examples, these schedules are of the type described as fan speed schedule 33 in U.S. Pat. No. 4,184,327 (Cornett, et al.) which is hereby incorporated by reference.

In response to the sensed parameter values, the schedules generate signals indicative of maximum and minimum amounts of fuel allowed under the current operating conditions to prevent events such as engine stalling and over- and under-accelerations. The maximum and minimum signals of schedules 16 and 31 are modified at summers 18 and 33 by the feedback signal present on conduit 77. This feedback signal is, ignoring the action of stabilizer block 73, reflective of the difference between the preliminary output signal (namely, that present at the output of integrator 63) and the actual engine speed (that present on conduit 71). These maximum and minimum signals, so modified, are then weighted or scaled by multiplier blocks 21 and 35. The output of the former is fed to minimum selector 12 and the output of the latter is fed to maximum selector 27. The scaling by multiplier blocks 9, 21, and 35 functions to adjust (i.e., scale) the level of the signals received by them so that these signals are compatible with other signals in other components in the system, as in maximum selector 27.

The input signal present on lead 4 is typically generated by equipment under the control of the turbine's operator, such as a pilot of a jet aircraft, although the input signal could be generated by automated equipment. The input signal is indicative of an engine speed desired by the pilot. Subtracted from this signal of desired engine speed at summer 7 is the output signal of integrator 63. The resulting signal is weighted by multiplier block 9 and fed to minimum selector 12.

Minimum and maximum selectors 12 and 27 function to subject output of summer 7, which output is a speed error signal, to maximum and minimum limits established by schedules 16 and 31. That is, minimum and maximum selectors 12 and 27 in effect bound or bracket the speed error signal provided by summer 7 between the two signals present on conduits 15 and 30. This first bracketed signal, namely that on the output 38 of maximum selector 27, is further bracketed by maximum and minimum selectors 52 and 41 between the signals present on conduits 44 and 55, namely, the signals which indicate maximal and minimal accelerations allowed under the present operating conditions and established by schedules 47 and 58. Viewed another way, the circuit elements between lead 4 and integrator 63 function to limit the effect or influence of the desired engine speed signal.

The second bracketed signal, namely that present at the input of integrator 63 and which has been processed so that it is bound within the limits imposed by schedules 16, 31, 47 and 58, is integrated by the integrator 63 to provide a preliminary output signal on output 64 and the preliminary output signal then is updated at summer 68 by subtraction of the actual engine speed from it. The output of summer 68 is fed to stabilizing block 73 which increases the stability of the signal in a well known manner and the signal as stabilized is then fed back on conduit 77 to modify the effect of the maximum and minimum metering valve velocity schedules. The output signal of stabilizer 73 is then integrated by integrator 75 to be fed as a signal for controlling fuel delivery to the fuel supply control equipment 79. This equipment 79 controls the amount of fuel supplied to the turbine engine 3 and includes a valve (not shown) which assists in the fuel control function.

Thus, the present invention controls a controlled variable, such as engine speed, by modifying the fuel supplied to the gas turbine engine in response to an operator's command. The fuel supplied is subject to maximum and minimum limits imposed by fuel metering valve velocity schedules whose purpose is to bound fuel flow rate and also subject to limits imposed by maximum and minimum engine acceleration schedules. A closed loop system is accordingly disclosed which has three feedback sources: the output of integrator 63 as fed back to summer 7, the input of integrator 75 which is fed back to summers 18 and 33, and the actual engine speed which is fed back to summer 68 on conduit 71.

An important advantage of the control of the present invention is provided through the presence of the integrator 63 (and its associated feedback loop to the input signal through summer 7). One reason for this is that the preliminary output signal at conduit 64 represents a time trajectory of the desired engine speed. The trajectory is constantly modified by feedback and by the schedules 16, 31, 47, and 58 so that the limits imposed by thesse schedules are nearly simultaneously and constantly maintained. Further, engine acceleration is utilized indirectly as an input to the invention without actually measuring the acceleration itself.

An invention has been described which limits a speed error signal in at least two ways. First, the error signal is bracketed or bounded between upper and lower fuel flow limits. Second, the error signal is bounded between upper and lower engine acceleration limits. The error signal so bounded is integrated, modified by current engine speed, stabilized and integrated again, and then applied to a fuel control to control the amount of fuel delivered to an engine.

While one embodiment of the invention has been disclosed, it will be obvious to persons skilled in the art that numerous substitutions and modifications can be undertaken without departing from the true spirit and scope of the invention. Accordingly, the invention as defined in the following claims is desired to be secured by Letters Patent of the United States.

I claim:

1. Method of driving a controlled variable, which is indicative of the rate of fuel presently being delivered to a gas turbine engine, to a desired value in response to an input signal, comprising the steps of:
  (a) processing the input signal to produce a processed signal having a value within a predetermined range;
  (b) generating a preliminary output signal having a time derivative substantially equal to the value of the processed signal;
  (c) subtracting from the input signal a signal derived from the preliminary output signal;
  (d) subtracting from the preliminary output signal a signal derived from the controlled variable;
  (e) modifying the predetermined range of (a) in accordance with the subtracted preliminary output signal of (d);
  (f) generating an output signal having a time derivative which is a function of the preliminary output signal after the subtraction of (d); and,
  (g) modifying the controlled variable in accordance with the output signal.

* * * * *